United States Patent
Shi et al.

(10) Patent No.: US 11,356,905 B2
(45) Date of Patent: Jun. 7, 2022

(54) HANDLING OF APPLICATION LAYER MEASUREMENTS DURING HANDOVER IN WIRELESS COMMUNICATION NETWORKS

(71) Applicant: TELEFONAKTIEBOLAGET LM ERICSSON (PUBL), Stockholm (SE)

(72) Inventors: Nianshan Shi, Järfälla (SE); Cecilia Eklöf, Täby (SE); Walter Müller, Upplands Väsby (SE); Mattias Bergström, Sollentuna (SE); Waikwok Kwong, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/637,559

(22) PCT Filed: Aug. 10, 2018

(86) PCT No.: PCT/IB2018/056066
§ 371 (c)(1),
(2) Date: Feb. 7, 2020

(87) PCT Pub. No.: WO2019/030737
PCT Pub. Date: Feb. 14, 2019

(65) Prior Publication Data
US 2020/0413301 A1    Dec. 31, 2020

Related U.S. Application Data

(60) Provisional application No. 62/544,528, filed on Aug. 11, 2017.

(51) Int. Cl.
| H04W 36/00 | (2009.01) |
| H04L 5/00 | (2006.01) |
| H04W 36/08 | (2009.01) |

(52) U.S. Cl.
CPC ....... *H04W 36/0044* (2013.01); *H04L 5/0055* (2013.01); *H04W 36/0058* (2018.08); *H04W 36/00837* (2018.08); *H04W 36/08* (2013.01)

(58) Field of Classification Search
CPC ............ H04L 5/0055; H04W 36/0044; H04W 36/0055; H04W 36/0058; H04W 36/00837; H04W 36/08
See application file for complete search history.

(56) References Cited

U.S. PATENT DOCUMENTS

2012/0100853 A1*  4/2012  Xiong ................... H04W 48/16
                                                                    455/436
2015/0208283 A1*  7/2015  Yang ................. H04W 36/0055
                                                                    370/331

OTHER PUBLICATIONS

Ericsson, "QoE SRNS Relocation Enhancement", 3GPP TSG-RAN WG3 Meeting #95bis, R3-171179, Apr. 3-7, 2017. (Year: 2017).*
(Continued)

*Primary Examiner* — Khoa Huynh

(57) ABSTRACT

Methods and related wireless device and radio network node, which enable the handling of Quality of Experience, QoE, measurements during handover, are described. In some aspects, the wireless device may determine whether to report QoE measurements and whether to start new QoE measurements, in a cell served by a target radio network node, based, at least in part, on the presence or absence of QoE-measurement related indications in the handover command message received from the target radio network node.

15 Claims, 7 Drawing Sheets

(56) References Cited

OTHER PUBLICATIONS

Ericsson, "QoOE SRNS Relocation Enhancement", 3GPP TSG-RAN WG3 Meeting #95bis, R3-171179, Apr. 3-7, 2017. (Year: 2017).*

Ericsson, "QoE enhancement during SRNS relocation", 3GPP TSG-RAN WG3 Meeting #95bis, R3-171377, Apr. 3-7, 2017. (Year: 2017).*

3GPP, 3rd Generation Partnership Project; Technical Specification Group Radio Access Network; Evolved Universal Terrestrial Radio Access (E-UTRA); Radio Resource Control (RRC); Protocol specification (Release 14), TS 36.331 V14.3.0, Jun. 2017.

3GPP, 3rd Generation Partnership Project; Technical Specification Group Radio Access Network; Evolved Universal Terrestrial Radio Access Network (E-UTRAN); S1 Application Protocol (S1AP) (Release 14), TS 36.413 V14.3.0, Jun. 2017.

3GPP, 3rd Generation Partnership Project; Technical Specification Group Radio Access Network; Evolved Universal Terrestrial Radio Access Network (E-UTRAN); X2 application protocol (X2AP), (Release 14), TS 36.423 V14.3.0, Jun. 2017.

Ericsson, "QoE SRNS Relocation Enhancement", R3-171179, 3GPP TSG-RAN WG3 Meeting #95bis, Spokane, USA, Apr. 3-7, 2017, 1 page.

Ericsson, QoE enhancement during SRNS relocation, R3-171377, 3GPP TSG-RAN WG3 Meeting #95bis, Spokane, USA, Apr. 3-7, 2017, 8 pages.

Ericsson, QoE for streaming services in E-UTRAN, R3-171830, 3GPP TSG-RAN WG3 Meeting #96, Hangzhou, China, May 15-19, 2017, 2 pages.

Nokia et al., QMC agreements analysis in E-UTRAN, R2-1705110, 3GPP TSG-RAN WG2 Meeting #98, Hangzhou, China, May 15-19, 2017, 3 pages.

ISR and Written Opinion dated Nov. 27, 2018 from corresponding application PCT/IB2018/056066.

* cited by examiner

HANDLING OF APPLICATION LAYER MEASUREMENTS DURING HANDOVER IN WIRELESS COMMUNICATION NETWORKS

RELATED APPLICATIONS

The present application claims the benefits of priority of U.S. Provisional Patent Application No. 62/544,528, entitled "HANDLING OF APPLICATION LAYER MEASUREMENTS DURING HANDOVER IN WIRELESS COMMUNICATION NETWORKS", and filed at the United States Patent and Trademark Office on Aug. 11, 2017, the content of which is incorporated herein by reference.

TECHNICAL FIELD

The present description generally relates to wireless communications and wireless communication networks, and more particularly relates to the handling of application layer measurements during handover in wireless communication networks.

BACKGROUND

For release 15, 3GPP has approved a work item for "Quality of Experience (QoE) Measurement Collection" in LTE. Similar features may later also be applicable in NR. The purpose of the work item is to start measurements in the user equipment (UE) to collect information about the quality of streaming services used in the UE. The streaming service is typically a third party streaming application on top of a packet-switched interactive radio access bearer (PS Interactive RAB) defined in the radio access network (RAN). The purpose of the measurement collection is to be able to improve the quality of the streaming service.

The measurements may be initiated towards the RAN directly from an operation and management (O&M) node in a generic way for a group of user equipments (UEs). The measurements may also be initiated towards the RAN by receiving a "trace request" from the core network. The configuration of the measurement includes the measurement details, which are encapsulated in a container that is transparent to the RAN.

When initiated via the CN, the measurement is directed towards a specific UE. The "trace request" referred to above is realized as a S1AP message LTE which carries the configuration information for the measurement details and the trace collection entity to which the collected measurements should be sent.

The RAN is not aware of when the streaming session is ongoing in the UE and is also not aware of when the measurements are ongoing. It is important for the client analyzing the measurements that the whole session is measured. It is an implementation decision when the RAN stops the measurements. Typically, it is done when the UE has moved outside the measurement area.

It is considered beneficial that, if there is a packet-switched streaming session, the UE would keep the QoE measurement for the whole session, even during handover situation(s). It has been concluded during a 3GPP study that fragmented QoE measurement reports are of little use.

At handover, the RRC message which is sent to the UE (i.e., the HandoverCommand) is built in the target RAN node but sent to the UE by the source RAN node. It is transferred between the RAN nodes by means of network signaling on the X2 or S1 interfaces.

SUMMARY

During handover (e.g., X2 or S1), the wireless device will be handed over from a source radio network node to a new target radio network node (e.g. a new eNB). If the source radio network node (before the handover) has started, that is configured QoE measurements in the wireless device, but the target radio network node (after the handover) does not support QoE measurement reporting, or may not wish to receive the QoE measurement report, how such a scenario is handled is currently not specified. QoE measurement reports may be quite large and sending QoE measurement reports to radio network nodes which do not support the feature should be avoided as resources would then be consumed for nothing as the radio network node would anyhow not be able to interpret what it has received.

Fragmented QoE measurement reports are also of little use to the QoE node and there is currently no good way to ensure that the reports are as complete as possible.

Hence, in some broad embodiments, the target radio network node may inform the wireless device explicitly whether QoE measurement reporting is allowed. In some embodiments, if the target radio network node does not indicate anything to the wireless device, the wireless device may consider this as an indication that QoE measurement reporting is not allowed/not supported by the target radio network node. Consequently, the wireless device may temporarily stop reporting after handover, e.g., to save uplink resources.

In some embodiments, the target radio network node may also inform the wireless device whether the target radio network node is in the measurement area. This indication can be used by the wireless device to know if new QoE measurements should be started or not.

According to one aspect, some embodiments include a method performed by a wireless device. The method generally comprises performing Quality of Experience, QoE, measurements in a cell served by a source radio network node; receiving a handover command message from a target radio network node via the source radio network node, the handover command message indicating to the wireless device to handover to the target radio network node; and determining whether to report the QoE measurements to the target radio network node based, at least in part, on a presence or absence of a QoE measurement reporting support indication in the handover command message.

In some embodiments, determining whether to report the QoE measurements further comprises determining to refrain from reporting the QoE measurements if the QoE measurement reporting support indication is absent from the handover command message.

In some embodiments, determining whether to report the QoE measurements further comprises determining to refrain from reporting the QoE measurements if the QoE measurement reporting support indication is present in the handover command message and indicates that QoE measurement reporting is not supported.

In some embodiments, determining whether to report the QoE measurements further comprises determining to report the QoE measurements if the QoE measurement reporting support indication is present in the handover command message and indicates that QoE measurement reporting is supported. In such embodiments, the method may comprise, or further comprise sending a QoE measurement report comprising the QoE measurements to the target radio network node.

In some embodiments, the method may comprise, or further comprise determining whether to start new QoE measurements in a cell served by the target radio network node based, at least in part, on a presence or absence of a QoE measurement area indication in the handover command message.

In some embodiments, determining whether to start new QoE measurements further comprises determining not to start QoE measurements if the QoE measurement area indication is absent from the handover command message.

In some embodiments, determining whether to start new QoE measurements further comprises determining not to start QoE measurements if the QoE measurement area indication is present in the handover command message and indicates that the cell served by the target radio network node is not in a measurement area associated with the new QoE measurements.

In some embodiments, determining whether to start new QoE measurements further comprises determining to start QoE measurements if the QoE measurement area indication is present in the handover command message and indicates that the cell served by the target radio network node is in a measurement area associated with the new QoE measurements.

In some embodiments, the method may comprise, or further comprise, transmitting a handover confirmation message to the target radio network node.

According to another aspect, some embodiments include a wireless node adapted, configured, or otherwise operable, to perform one or more wireless node functionalities (e.g. actions, operations, steps, etc.) as described herein.

In some embodiments, the wireless node may comprise one or more communication interfaces configured to communicate with one or more radio network nodes, and processing circuitry operatively connected to the communication interface, the processing circuitry being configured to perform one or more wireless node functionalities as described herein. In some embodiments, the processing circuitry may comprise at least one processor and at least one memory storing instructions which, upon being executed by the processor, configure the at least one processor to perform one or more wireless node functionalities as described herein.

In some embodiments, the wireless node may comprise one or more functional modules configured to perform one or more wireless node functionalities as described herein.

According to another aspect, some embodiments include a computer program product comprising a non-transitory computer-readable storage medium storing computer-readable program instructions or code which, upon being executed by processing circuitry (e.g., at least one processor) of the wireless node, configure the processing circuitry to perform one or more wireless node functionalities as described herein.

According to another aspect, some embodiments include a method performed by a source radio network node. The method generally comprises determining to perform a handover of a wireless device from the source radio network node to a target radio network node; transmitting a handover request message to the target radio network node, the handover request message comprising an indication that the wireless device has been configured for Quality of Experience, QoE, measurements; receiving a handover request acknowledgement message from the target radio network node, the handover request acknowledgement message comprising a handover command message; and forwarding the handover command message to the wireless device.

In some embodiments, the handover request message may further comprise QoE measurement configuration parameters.

In some embodiments, the QoE measurement configuration parameters may comprise a list of one or more cells comprised in a QoE measurement area associated with the QoE measurements.

In some embodiments, the handover command message may comprise a QoE measurement reporting support indication indicating whether the target radio network node supports QoE measurement reporting.

In some embodiments, the handover command message may comprise, or further comprise, a QoE measurement area indication indicating whether a cell served by the target radio network node is comprised in a measurement area associated with the QoE measurements.

According to another aspect, some embodiments include a method performed by a target radio network node. The method generally comprises receiving a handover request message from a source radio network node to handover a wireless device from the source radio network node to the target radio network node, the handover request message comprising an indication that the wireless device has been configured for Quality of Experience, QoE, measurements; and transmitting a handover request acknowledgement message to the source radio network node, the handover request acknowledgement message comprising a handover command message.

In some embodiments, the handover request message may further comprise QoE measurement configuration parameters.

In some embodiments, the QoE measurement configuration parameters may comprise a list of one or more cells comprised in a QoE measurement area associated with the QoE measurements.

In some embodiments, the handover command message may comprise a QoE measurement reporting support indication indicating whether the target radio network node supports QoE measurement reporting.

In some embodiments, the handover command message may comprise, or further comprise, a QoE measurement area indication indicating whether a cell served by the target radio network node is comprised in a measurement area associated with the ongoing QoE measurements.

In some embodiments, the method may comprise, or further comprise, receiving a handover confirmation message from the wireless device.

According to another aspect, some embodiments include a radio network node adapted, configured, or otherwise operable, to perform one or more radio network node functionalities (e.g. actions, operations, steps, etc.) as described herein.

In some embodiments, the radio network node may comprise one or more communication interfaces configured to communicate with one or more wireless devices, with one or more other radio network nodes, and/or with one or more network nodes, and processing circuitry operatively connected to the communication interface, the processing circuitry being configured to perform one or more radio network node functionalities as described herein. In some embodiments, the processing circuitry may comprise at least one processor and at least one memory storing instructions which, upon being executed by the processor, configure the at least one processor to perform one or more radio network node functionalities as described herein.

In some embodiments, the radio network node may comprise one or more functional modules configured to perform one or more radio network node functionalities as described herein.

According to another aspect, some embodiments include a computer program product comprising a non-transitory computer-readable storage medium storing computer-readable program instructions or code which, upon being executed by processing circuitry (e.g., at least one processor) of the radio network node, configure the processing circuitry to perform one or more radio network node functionalities as described herein.

Some embodiments may enable the saving of network resources. Some embodiments may also allow the QoE measurement reports to be complete in most cases.

Currently only QoE measurements for streaming services have been included in the 3GPP specifications, but in later releases other type of application layer measurements may be added. Thus, while the present description and figures mostly describes QoE-related measurements, the concept as such is valid for any type of application layer measurements This summary is not an extensive overview of all contemplated embodiments and is not intended to identify key or critical aspects or features of any or all embodiments or to delineate the scope of any or all embodiments. In that sense, other aspects and features will become apparent to those ordinarily skilled in the art upon review of the following description of specific embodiments in conjunction with the accompanying figures.

BRIEF DESCRIPTION OF THE DRAWINGS

Exemplary embodiments will be described in more detail with reference to the following figures, in which.

DETAILED DESCRIPTION

The embodiments set forth below represent information to enable those skilled in the art to practice the embodiments. Upon reading the following description in light of the accompanying figures, those skilled in the art will understand the concepts of the description and will recognize applications of these concepts not particularly addressed herein. It should be understood that these concepts and applications fall within the scope of the description.

In the following description, numerous specific details are set forth. However, it is understood that embodiments may be practiced without these specific details. In other instances, well-known circuits, structures, and techniques have not been shown in detail in order not to obscure the understanding of the description. Those of ordinary skill in the art, with the included description, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

As used herein, the singular forms "a", "an" and "the" are intended to include the plural forms as well, unless the context clearly indicates otherwise. It will be further understood that the terms "comprises," "comprising," "includes," and/or "including" when used herein, specify the presence of stated features, integers, steps, operations, elements, and/or components, but do not preclude the presence or addition of one or more other features, integers, steps, operations, elements, components, and/or groups thereof.

Figure 1:
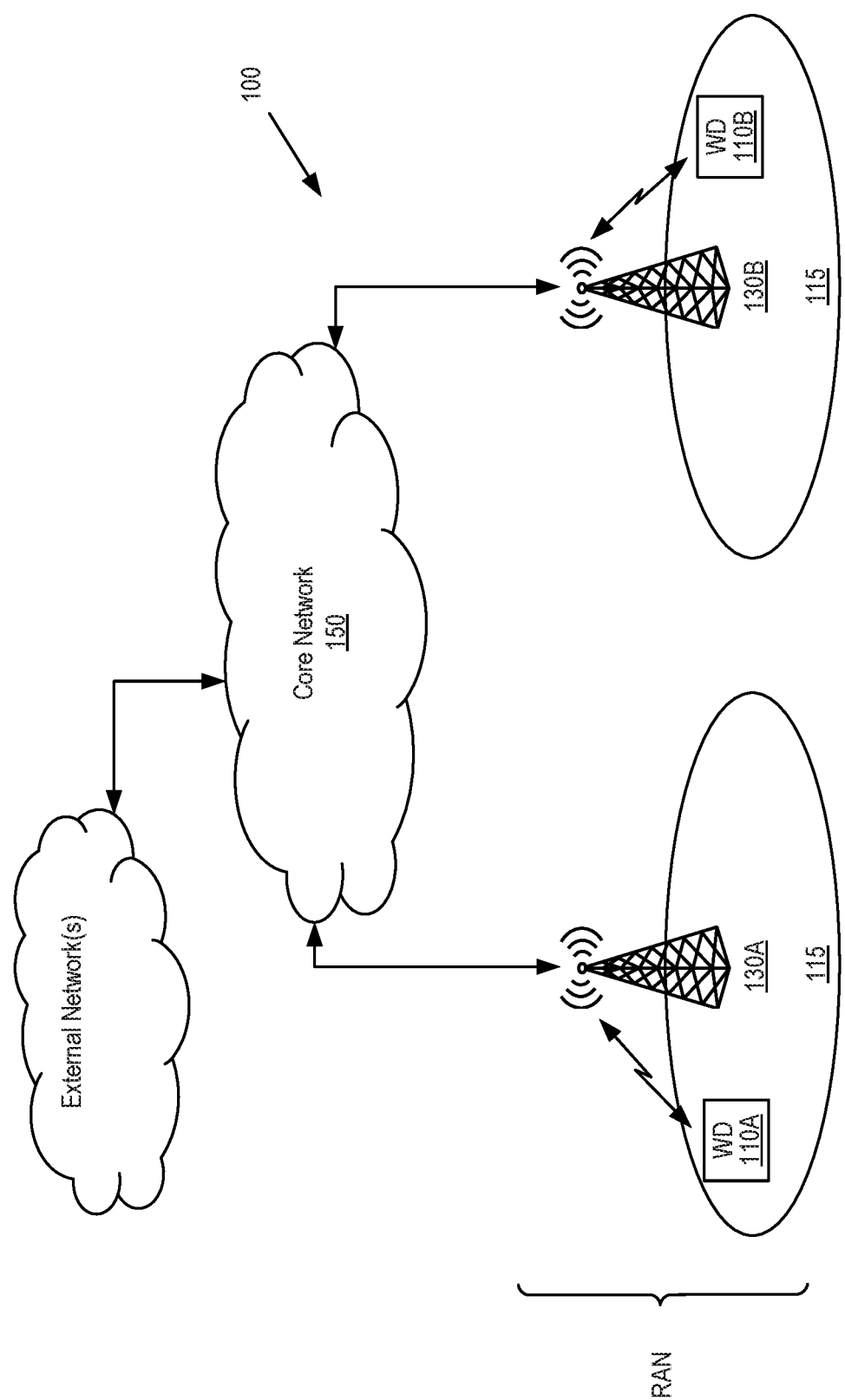
FIG. 1 is a schematic diagram of an example communication network according to some embodiments.

FIG. 1 illustrates an example of a wireless network 100 that may be used for wireless communications. Wireless network 100 includes wireless devices 110A-110B (collectively referred to as wireless devices or WDs 110) and a plurality of radio network nodes 130A-130B (e.g., NBs and/or RNCs in UMTS, eNBs in LTE, gNBs in NR, etc.) (collectively referred to as radio network node or radio network nodes 130) directly or indirectly connected to a core network 150 which may comprise a plurality of core network nodes (e.g., SGSNs and/or GGSNs in UMTS, MMEs, SGWs, and/or PGWs in LTE/EPC, AMFs, SMFs, and/or UPFs in NGC, etc.) (collectively referred to as core network node or core network nodes). The network 100 may use any suitable radio access network (RAN) deployment scenarios, including UMTS Terrestrial Radio Access Network, UTRAN, Evolved UMTS Terrestrial Radio Access Network, E-UTRAN, and Next Generation Radio Access Network, NG-RAN. Wireless devices 110 within coverage areas 115 may each be capable of communicating directly with radio network nodes 130 over a wireless interface. In certain embodiments, wireless devices may also be capable of communicating with each other via device-to-device (D2D) communication.

As an example, wireless device 110A may communicate with radio network node 130A over a wireless interface. That is, wireless device 110A may transmit wireless signals to and/or receive wireless signals from radio network node 130A. The wireless signals may contain voice traffic, data traffic, control signals, and/or any other suitable information. In some embodiments, an area of wireless signal coverage associated with a radio network node 130 may be referred to as a cell.

Figure 2:
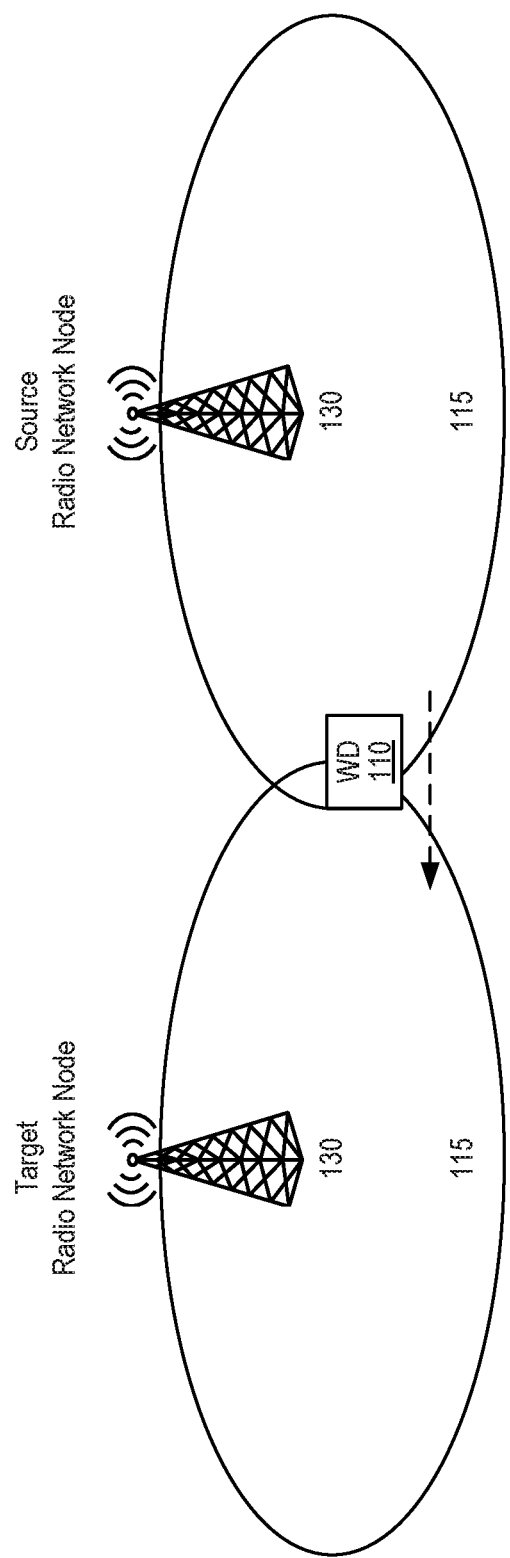
FIG. 2 is a schematic diagram of a handover of a wireless device in a communication network according to some embodiments.

FIG. 2 illustrates a simplified scenario in which a handover of a wireless device 110 can be performed. A handover of a wireless device 110 from a source cell 115 served by a source radio network node 130 to a target cell 115 served by a target radio network node 130 may occur, for instance, when the wireless device 110 moves from the source cell 115 to the target cell 115.

As indicated above, when a wireless device 110 which has been configured for QoE measurements (and is possibly performing QoE measurements) is handed over to a target radio network node, the target radio network node may not support QoE measurement reporting. Hence, according to some embodiments, one solution is to introduce, in the RRC message (an RRCConnectionReconfiguration encapsulated in a HandoverCommand) from the target radio network node an explicit indication, e.g. "QoE measurement reporting allowed", "QoE measurement reporting supported", etc., to allow the wireless device to report the QoE measurements after the handover. An explicit indication of "QoE measurement reporting not allowed" or "QoE measurement reporting not supported" can also be introduced.

In some embodiments, if the target radio network node does not indicate anything with respect to the QoE measurement reporting, the wireless device 110 may infer that QoE measurement reporting is not supported by the target radio network node and may refrain from reporting QoE measurements after handover.

In the handover request message (e.g., an X2AP HANDOVER REQUEST message) sent by the source radio network node, the measurement area can also be forwarded from the source radio network node to the target radio network node. The target radio network node then knows if the target cell is in the measurement area or not. The target radio network node may then also indicate to the wireless device, in the handover command message, that the cell served by the target radio network node is within the measurement area. An explicit indication such as "QoE area indication" or "QoE measurement area" could be used.

When the wireless device moves around in the network, there are different scenarios that may occur. The wireless device can use these two indications as follows:
1) The target radio network node supports QoE measurement reporting and the new cell (i.e., the target cell) is within the measurement area.
2) The target radio network node supports QoE measurement reporting, but the new cell is not within the measurement area.
3) The target radio network node does not support QoE measurement reporting.

In scenario 1), the QoE measurements should continue in the cell served by the target radio network node. The source radio network node sends the configuration information, e.g., the specified area to the target radio network node. At handover, the target radio network node builds the handover message which is sent to the wireless device. The target radio network node can include information in the message to the wireless device that QoE measurement reporting is allowed and that the cell is within the measurement area.

In scenario 2), the target radio network node supports QoE measurement reporting, but the target cell is not within the measurement area which means that preferably no new QoE measurements should be started in that cell. However, it is preferred that the ongoing QoE measurements be finished for the ongoing session before being terminated to avoid an incomplete QoE measurement report. Therefore, the target radio network node can, in this case, include information to the wireless device in the handover message that QoE measurement reporting is allowed, but that the cell is not within the measurement area. The wireless device may then finalize the QoE measurements of any ongoing session and send the QoE measurement report, but after that not start any new QoE measurements.

In scenario 3), if the target radio network node does not support QoE measurement reporting, it is usually important that the wireless device is informed about it, so that large measurement reports, which cannot be understood by the target radio network node, are not sent in the network and consume resources for no use. It is usually impractical for the source radio network node to stop or suspend the QoE measurements at handover as it is the target radio network node that builds the RRC message that is sent to the wireless device.

In some embodiments, the lack of indication that QoE measurement reporting is allowed may implicitly inform the wireless device that QoE measurement reports cannot be sent to the target radio network node. The wireless device may still finalize the ongoing QoE measurements and possibly send the QoE measurement report later if it later reaches a radio network node which supports QoE measurement reporting.

Further, to assist the target radio network node, during the handover preparation, the source radio network node could inform the target radio network node if the QoE measurement has been configured for the concerned wireless device. For example, an explicit indication could be introduced in the HANDOVER REQUEST message in X2AP as shown in Table 1 below.

TABLE 1

Example of an indication from source RAN to inform that QoE measurements have been configured in X2AP HANDOVER REQUEST message

| IE/Group Name | Presence | Range | IE type and reference | Semantics description | Criticality | Assigned Criticality |
|---|---|---|---|---|---|---|
| Message Type | M | | 9.2.13 | | YES | reject |
| Old eNB UE X2AP ID | M | | eNB UE X2AP ID 9.2.24 | Allocated at the source eNB | YES | reject |
| Cause | M | | 9.2.6 | | YES | ignore |
| Target Cell ID | M | | ECGI 9.2.14 | | YES | reject |
| GUMMEI | M | | 9.2.16 | | YES | reject |
| UE Context Information | | 1 | | | YES | reject |
| >MME UE S1AP ID | M | | INTEGER $(0 \ldots 2^{32} - 1)$ | MME UE S1AP ID allocated at the MME | — | — |

TABLE 1-continued

Example of an indication from source RAN to inform that QoE measurements have been configured in X2AP HANDOVER REQUEST message

| IE/Group Name | Presence | Range | IE type and reference | Semantics description | Criticality | Assigned Criticality |
|---|---|---|---|---|---|---|
| >UE Security Capabilities | M | | 9.2.29 | | — | — |
| >AS Security Information | M | | 9.2.30 | | — | — |
| >UE Aggregate Maximum Bit Rate | M | | 9.2.12 | | — | — |
| Subscriber Profile ID for RAT/Freguency priority | O | | 9.2.25 | | — | — |
| >E-RABs To Be Setup List | | 1 | | | — | — |
| >>E-RABs To Be Setup Item | | 1 . . . <maxnoof Bearers> | | | EACH | ignore |
| >>>E-RAB ID | M | | 9.2.23 | | — | — |
| >>>E-RAB Level QoS Parameters | M | | 9.2.9 | Includes necessary QoS parameters | — | — |
| >>>DL Forwarding | O | | 9.2.5 | | — | — |
| >>>UL GTP Tunnel Endpoint | M | | GTP Tunnel Endpoint 9.2.1 | SGW endpoint of the S1 transport bearer. For delivery of UL PDUs. | — | — |
| >>>Bearer Type | O | | 9.2.92 | | YES | reject |
| >RRC Context | M | | OCTET STRING | Includes the RRC Handover Preparation Information message as defined in subclause 10.2.2 of TS 36.331 [9] | — | — |
| >Handover Restriction List | O | | 9.2.3 | | — | — |
| >Location Reporting Information | O | | 9.2.21 | Includes the necessary parameters for location reporting | — | — |
| >Management Based MDT Allowed | O | | 9.2.59 | | YES | ignore |
| >Management Based MDT PLMN List | O | | MDT PLMN List 9.2.64 | | YES | ignore |
| >UE Sidelink Aggregate Maximum Bit Rate | O | | 9.2.97 | This IE applies only if the UE is authorized for V2X services. | YES | Ignore |
| UE History Information | M | | 9.2.38 | Same definition as in TS 36.413 [4] | YES | ignore |
| Trace Activation | O | | 9.2.2 | | YES | ignore |
| SRVCC Operation Possible | O | | 9.2.33 | | YES | ignore |
| CSG Membership Status | O | | 9.2.52 | | YES | reject |
| Mobility Information | O | | BIT STRING (SIZE (32)) | Information related to the handover; the source eNB provides it in order to enable later analysis of the conditions that led to a wrong HO. | YES | ignore |
| Masked IMEISV | O | | 9.2.69 | | YES | ignore |
| UE History Information from the UE | O | | OCTET STRING | VisitedCellInfoList contained in the UEInformationResponse message (TS 36.331 [9]) | YES | ignore |
| Expected UE Behaviour | O | | 9.2.70 | | YES | ignore |
| ProSe Authorized | O | | 9.2.78 | | YES | ignore |
| UE Context Reference at the SeNB | O | | | | YES | ignore |
| >Global SeNB ID | M | | Global eNB ID 9.2.22 | | | |

TABLE 1-continued

Example of an indication from source RAN to inform that QoE measurements
have been configured in X2AP HANDOVER REQUEST message

| IE/Group Name | Presence | Range | IE type and reference | Semantics description | Criticality | Assigned Criticality |
|---|---|---|---|---|---|---|
| >SeNB UE X2AP ID | M | | eNB UE X2AP ID 9.2.24 | Allocated at the SeNB | | |
| >SeNB UE X2AP ID Extension | O | | Extended eNB UE X2AP ID 9.2.86 | Allocated at the SeNB | | |
| Old eNB UE X2AP ID Extension | O | | Extended eNB UE X2AP ID 9.2.86 | Allocated at the source eNB | YES | reject |
| V2X Services Authorized | O | | 9.2.93 | | YES | ignore |
| UE Context Reference at the WT | O | | | | YES | ignore |
| >WT ID | M | | 9.2.95 | | | |
| >WT UE XwAP ID | M | | 9.2.96 | | | |
| QoE measurement configured | O | | ENUMERATED (True, . . . ,) | Indicate that QoE measurements have been configured | YES | ignore |

Upon the reception of this information element, the target radio network node may perform the action(s) as described above. The source radio network node may also include some of the QoE measurement configuration parameters, such as the scope of the QoE measurement area (e.g. a choice of cell list/TA list/PLMN list where the QoE measurement applies).

In Table 2, an example of indications in RRC message that QoE measurement reporting is allowed and that the target cell is within the measurement area is shown.

TABLE 2

Example of indications in RRC message that QoE measurement reporting
is allowed and that the target cell is within the measurement area.

```
RRCConnectionReconfiguration-r15-IEs ::= SEQUENCE {
    qoE-ReportingAllowed-r15   QoE-reportingallowed-r15   OPTIONAL,  -- Need ON
    qoE-MeasurementArea-r15    QoE-MeasurementArea-r15    OPTIONAL   -- Need ON
```

Figure 3:
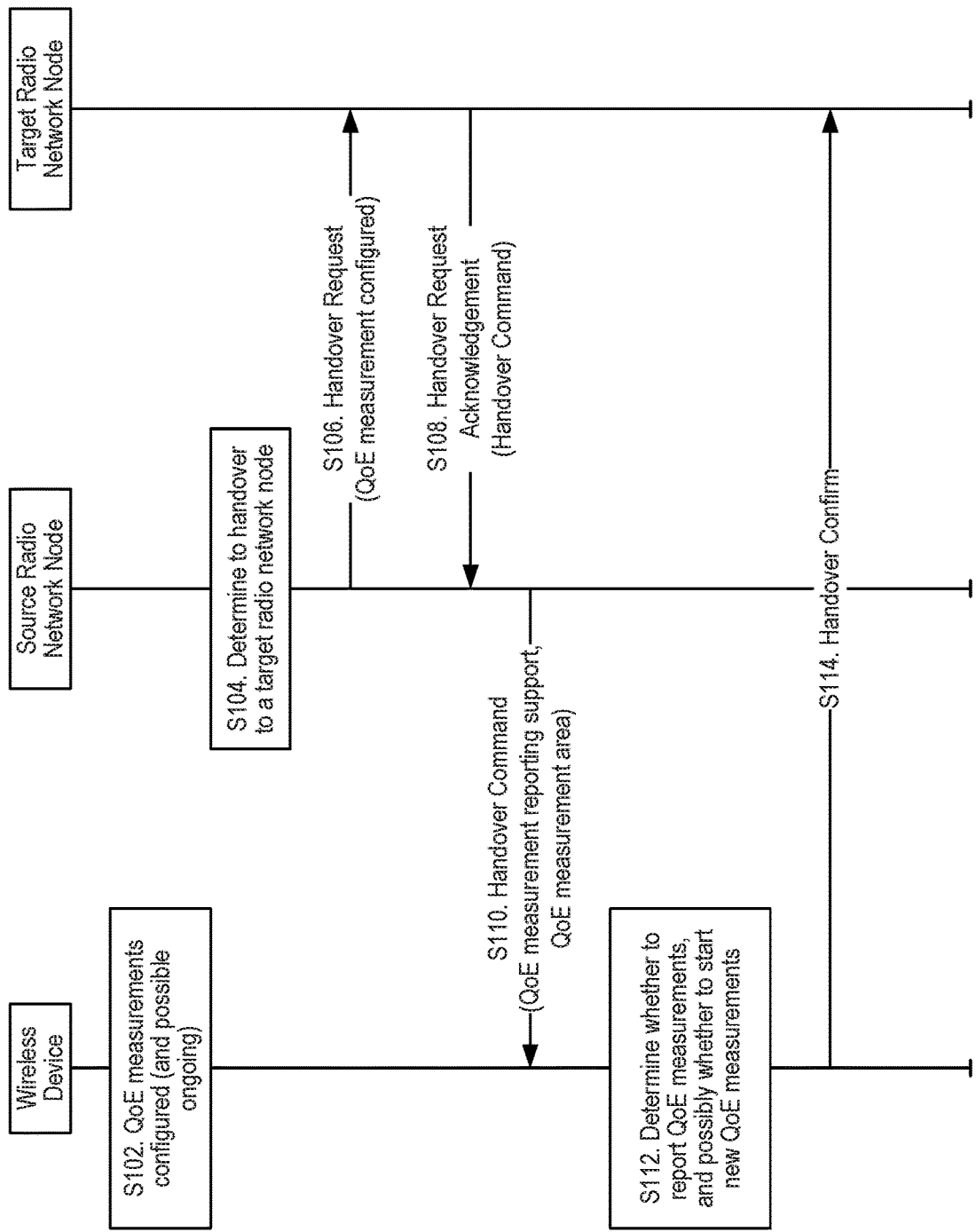
FIG. 3 is a signaling diagram according to some embodiments.

Referring to FIG. 3, a high-level signaling and operating diagram according to some embodiments is illustrated. As shown, the wireless device 110 has been configured for QoE measurements and may be performing, or otherwise collecting, QoE measurements (e.g., for a streaming service) (action S102). The wireless device 110 may be performing these QoE measurements after being configured to do so, e.g., by the source radio network node 130.

At some point, possibly after having received a measurement report (e.g., an RRC Measurement Report message) from the wireless device 110, the source radio network node 130 determines or otherwise decides to hand over the wireless device 110 to a target radio network node 130 (action S104). In preparation of the handover, the source radio network node 130 transmits a handover request message (e.g., an X2AP Handover Request message) to the target radio network node 130 (action S106). In some embodiments, the handover request message may include an indication that QoE measurements have been configured at the wireless device 110. For example, the handover request message may include the "QoE measurement configured" indication mentioned above in Table 1.

The target radio network node 130 responds to the handover request of the source radio network node 130 by transmitting a handover request acknowledgement message (e.g., an X2AP Handover Request Acknowledgement message) to the source radio network node (action S108). The handover request acknowledgement message typically comprises or carries a handover command message that the source radio network node 130 will transmit to the wireless device 110 (action S108). In some embodiments, the handover command message may include an indication indicating whether QoE measurement reporting is allowed or supported at the target radio network node 130 (the "QoE measurement reporting support" indication). In some embodiments, the handover command message may also include an indication indicating whether the cell served by the target radio network node is part of the measurement area associated with the QoE measurements (the "QoE measurement area" indication).

Upon receiving the handover request acknowledgement message from the target radio network node 130, the source radio network node 130 forwards the handover command message (e.g., an RRC Handover Command message) to the wireless device 110 (action S110).

Upon receiving the handover command message from the source radio network node 130, the wireless device 110 determines whether to report QoE measurements to the target radio network node 130 (action S112). As indicated above, if the target radio network node 130 does not support QoE measurement reporting, the wireless device 110 may refrain from reporting QoE measurements. If the target radio network node 130 does support QoE measurement reporting, then the wireless device 110 may report QoE measurements to the target radio network node 130. If the target radio network node 130 does support QoE measurement reporting, then the wireless device 110 may also determine whether to start QoE measurements based, at least in part, on whether a QoE measurement area indication, if present, indicates that the cell served by the target radio network node is in a measurement area associated with the QoE measurements.

Regardless of the decision of the wireless device 110 concerning the reporting of QoE measurements, the wireless device 110 typically transmits a handover confirmation message (e.g., an RRC Connection Reconfiguration Complete message) to the target radio network node 130 to trigger the completion of the handover procedure (action S114).

Figure 4:
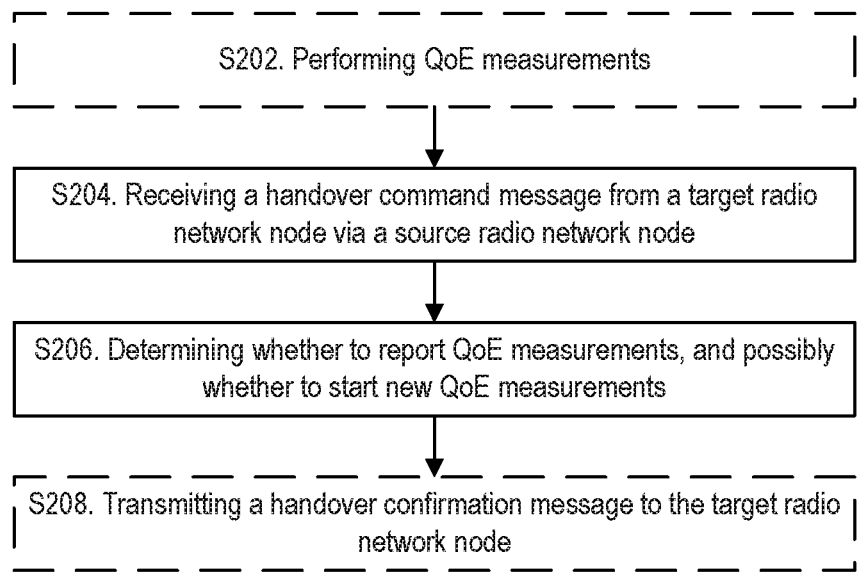
FIG. 4 is a flow chart of operations of a wireless device according to some embodiments.

FIG. 4 is a flow chart that illustrates operations of the wireless device 110 according to some embodiments. Notably, the wireless device 110 has typically been previously configured for QoE measurements by a radio network node 130, such as, for instance, the source radio network node 130. As illustrated, the wireless device 110 may be performing QoE measurements (action S202). At some point, the wireless device 110 receives a handover command message from a target radio network node 130 via a source radio network node 130 (e.g., the serving radio network node of the wireless device 110) (action S204). Depending on the QoE measurement reporting capabilities of the target radio network node 130, the handover command message may comprise one or more QoE-measurement related indications. In some embodiments, the handover command message may comprise a QoE measurement reporting support indication indicating whether the target radio network node 130 supports QoE measurement reporting. In some embodiments, the handover command message may also comprise a QoE measurement area indication indicating whether the cell served by the target radio network node 130 is part of the measurement area associated with the QoE measurements. Subsequently, the wireless device 110 determines whether to report QoE measurements to the target radio network node 130 and possibly to start new QoE measurements (action S206). The determination may be based, on the presence, or absence, of the QoE measurement reporting support indication and/or of the QoE measurement area indication. As indicated above, different scenarios are possible. Example embodiments of the behavior of the wireless device 110 depending on the scenario have been described above.

The wireless device 110 may also transmit a handover confirm message to the target radio network node 130 to trigger the completion of the handover procedure (action S208).

Figure 5:
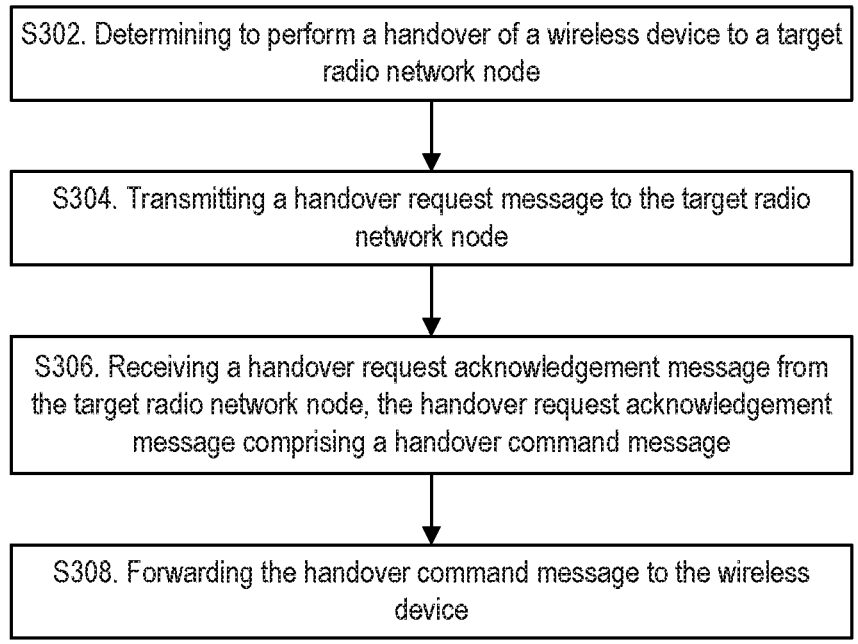
FIG. 5 is a flow chart of operations of a source radio network node according to some embodiments.

FIG. 5 is a flow chart that illustrates operations of the source radio network node 130 according to some embodiments. As illustrated, the source radio network node 130 determines or otherwise decides to perform a handover of the wireless device 110 to a target radio network node 130 (action S302). Subsequently, the source radio network node 130 transmits a handover request to the target radio network node 130 (action S304). In some embodiments, the handover request message may comprise an indication that QoE measurements have been configured for the wireless device 110 (e.g., see Table 1 above). The handover request message may also comprise QoE measurement configuration parameters such as a list of one or more cells part of the QoE measurement area where QoE measurements apply. The source radio network node 130 then receives a handover request acknowledgement message from the target radio network node 130 (action S306). The handover request acknowledgement message typically comprises or carries a handover command message which, as indicated above, may itself comprises one or more QoE-measurement related indications (e.g., see Table 2). For instance, the one or more QoE-measurement related indications may include an indication indicating whether QoE measurement reporting is supported at the target radio network node 130. The one or more QoE-measurement related indications may also include an indication indicating whether the cell served by the target radio network node, that is the target cell, is part of the QoE measurement area. Upon receiving the handover request acknowledgement message from the target radio network node 130, the source radio network node 130 forwards the handover command message to the wireless device 110 (action S308).

Figure 6:
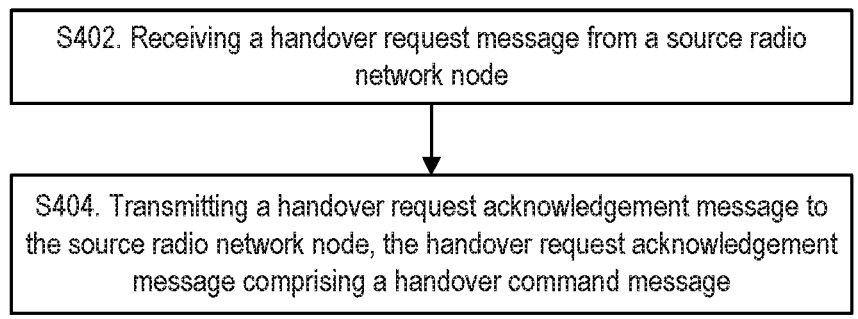
FIG. 6 is a flow chart of operations of a target radio network node according to some embodiments.

FIG. 6 is a flow chart that illustrates operations of the target radio network node 130 according to some embodiments. As illustrated, the target radio network node 130 receives a handover request message from a source radio network node 130 (action S402). In some embodiments, the handover request message may comprise an indication that QoE measurements have been configured at the wireless device 110 (e.g., see Table 1 above). The handover request message may also comprise QoE measurement configuration parameters such as a list of one or more cells part of the QoE measurement area where QoE measurements apply. The target radio network node 130 then transmits a handover request acknowledgement message to the source radio network node 130. The handover request acknowledgement message typically comprises or carries a handover command message which, as indicated above, may itself comprises one or more QoE-measurement related indications (see Table 2). The one or more QoE-measurement related indications may include an indication indicating whether QoE measurement reporting is supported at the target radio network node 130 and may also include an indication indicating whether the cell served by the target radio network node, that is the target cell, is part of the QoE measurement area Though not shown in FIG. 6, the target radio network node 130 may further receive a handover confirmation message from the wireless device concerned by the handover procedure.

It will be appreciated that the handover of a wireless device from a source radio network node to a target radio network node typically comprises additional signaling and operations which have not be shown in the figures in order not to obscure the figures. In that sense, for a wireless communication network operating according to the LTE standards, more details about the handover procedure and its related signaling and operations can be found, for instance, in 3GPP TS 36.331, version 14.3.0, and in 3GPP TS 36.423, version 14.3.0.

Some embodiments of a wireless device 110 will now be described with respect to FIGS. 7 and 8. As used herein, a "wireless device" is any type of device that has access to (i.e., may be served by) a wireless communication network by wirelessly transmitting and/or receiving signals to one or more radio network node(s). Notably, various communication standards sometimes use different terminologies when referring to or describing wireless devices. For instance, in addition to user equipment (UE), 3GPP also uses mobile terminal (MT). For its part, 3GPP2 uses the expression access terminal (AT) and IEEE 802.11 (also known as WiFi™) uses the term station (STA).

Figure 7:
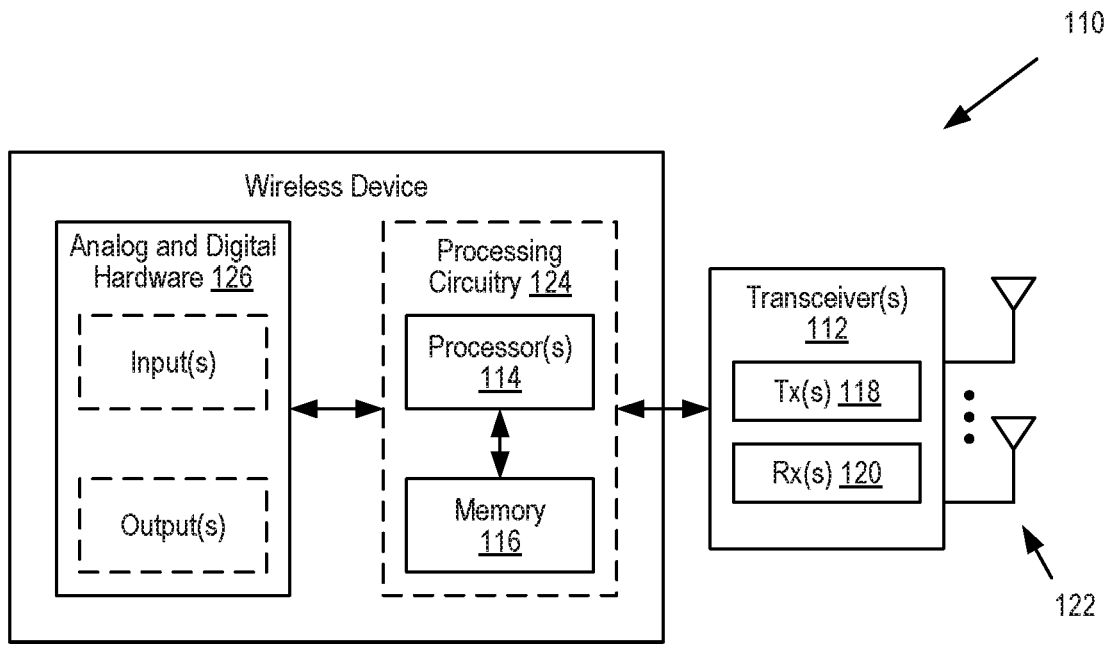
FIG. 7 is a block diagram of a wireless device according to some embodiments.

FIG. 7 is a block diagram of an exemplary wireless device 110 according to some embodiments. Wireless device 110 includes one or more of a transceiver 112, processor 114, and memory 116. In some embodiments, the transceiver 112 facilitates transmitting wireless signals to and receiving wireless signals from radio network node 130 (e.g., via transmitter(s) (Tx) 118, receiver(s) (Rx) 120 and antenna(s) 122). The processor 114 executes instructions to provide some or all of the functionalities described above as being provided by wireless device 110, and the memory 116 stores the instructions to be executed by the processor 114. In some embodiments, the processor 114 and the memory 116 form processing circuitry 124.

The processor 114 may include any suitable combination of hardware to execute instructions and manipulate data to perform some or all of the described functions of wireless device 110, such as the functions of wireless device 110 described above. In some embodiments, the processor 114 may include, for example, one or more computers, one or more central processing units (CPUs), one or more microprocessors, one or more application specific integrated circuits (ASICs), one or more field programmable gate arrays (FPGAs) and/or other logic.

The memory 116 is generally operable to store instructions, such as a computer program, software, an application including one or more of logic, rules, algorithms, code, tables, etc. and/or other instructions capable of being executed by a processor such as processor 114. Examples of memory 116 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by the processor 114 of wireless device 110.

Other embodiments of wireless device 110 may include additional components beyond those shown in FIG. 7 that may be responsible for providing certain aspects of the wireless device's functionalities, including any of the functionalities described above and/or any additional functionalities (including any functionality necessary to support the solution described above). As just one example, wireless device 110 may include analog and/or digital hardware 126 such as input devices and circuits and output devices and circuits. Input devices include mechanisms for entry of data into wireless device 110. For example, input devices may include input mechanisms, such as a microphone, input elements, a display, etc. Output devices may include mechanisms for outputting data in audio, video and/or hard copy format. For example, output devices may include a speaker, a display, etc.

Figure 8:
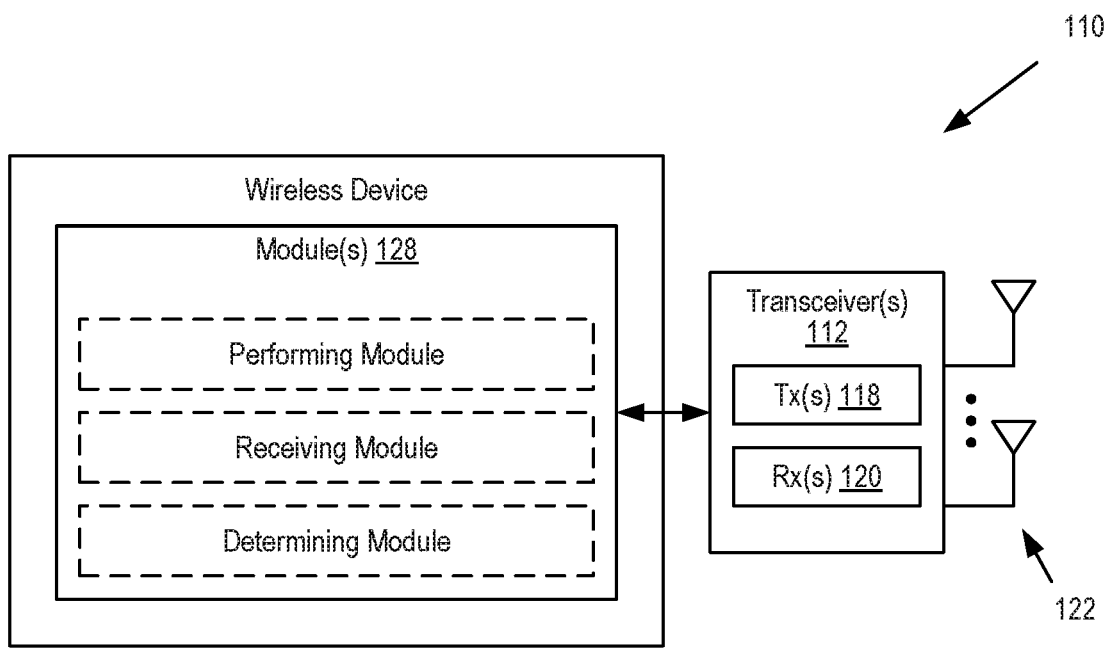
FIG. 8 is another block diagram of a wireless device according to some embodiments.

FIG. 8 is a block diagram of another exemplary wireless device 110 according to some embodiments. As illustrated, in some embodiments, the wireless device 110 may comprise a series of modules (or units) 128 configured to implement some or all of the functionalities of the wireless device 110 described above. More particularly, in some embodiments, the wireless device 110 may comprise a performing module configured to perform QoE measurements, a receiving module configured to receive a handover command message from a source radio network node, and a determining module configured to determine whether to report QoE measurements.

It will be appreciated that the various modules 128 may be implemented as combination of hardware and/or software, for instance, the processor 114, memory 116 and transceiver(s) 112 of wireless device 110 shown in FIG. 7. Some embodiments may also include additional modules 128 to support additional and/or optional functionalities.

Embodiments of a radio network node 130 will now be described with respect to FIGS. 9 and 10. As used herein, a "radio network node" is any node in a radio access network of a wireless communication network that operates to wirelessly transmit and/or receive signals. Notably, various communication standards sometimes use different terminologies when referring to or describing radio network nodes. For instance, in addition to base station, 3GPP also uses Node B (NB), and evolved Node B (eNB). For its part, IEEE 802.11 (also known as WiFi™) uses the term access point (AP). Some examples of a radio network node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Figure 9:
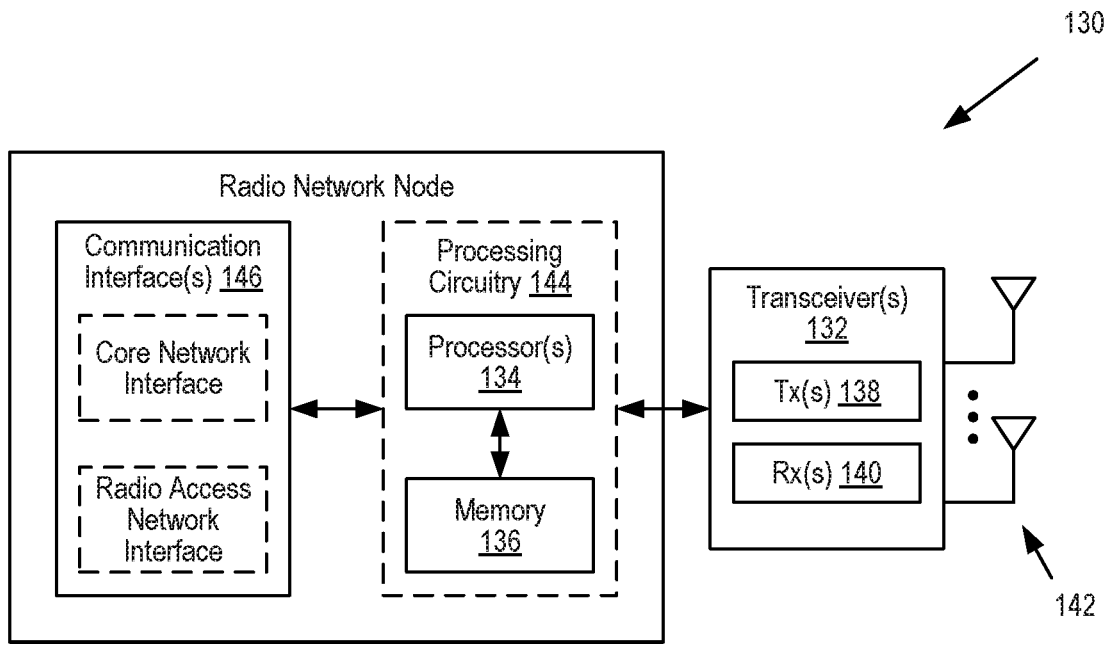
FIG. 9 is a block diagram of a radio network node according to some embodiments.

FIG. 9 is a block diagram of an exemplary radio network node 130, according to certain embodiments. Radio network node 130 may include one or more of a transceiver 132, a processor 134, a memory 136, and a communication interface 146. In some embodiments, the transceiver 132 facilitates transmitting wireless signals to and receiving wireless signals from UE 110 (e.g., via transmitter(s) (Tx) 138, receiver(s) (Rx) 140, and antenna(s) 142). The processor 134 executes instructions to provide some or all of the functionalities described above as being provided by a radio network node 130, the memory 136 stores the instructions to be executed by the processor 134. In some embodiments, the processor 134 and the memory 136 form processing circuitry 144. The communication interface(s) 146 enable the radio network 130 to communicate with other network nodes, including other radio network nodes (via a radio access network interface) and core network nodes (via a core network interface).

The processor 134 may include any suitable combination of hardware to execute instructions and manipulate data to perform some or all of the described functions of radio network node 130, such as those described above. In some embodiments, the processor 134 may include, for example, one or more computers, one or more central processing units (CPUs), one or more microprocessors, one or more application specific integrated circuits (ASICs), one or more field programmable gate arrays (FPGAs) and/or other logic.

The memory 136 is generally operable to store instructions, such as a computer program, software, an application including one or more of logic, rules, algorithms, code, tables, etc. and/or other instructions capable of being executed by a processor such as processor 134. Examples of memory 136 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, the communication interface 146 is communicatively coupled to the processor 134 and may refer to any suitable device operable to receive input for radio network node 130, send output from radio network node 130, perform suitable processing of the input or output or both, communicate to other devices, or any combination of the preceding. The network interface may include appropriate hardware (e.g., port, modem, network interface card, etc.) and software, including protocol conversion and data processing capabilities, to communicate through a network.

Other embodiments of radio network node 130 may include additional components beyond those shown in FIG. 9 that may be responsible for providing certain aspects of the radio network node's functionalities, including any of the functionalities described above and/or any additional functionalities (including any functionality necessary to support the solutions described above). The various different types of network nodes may include components having the same physical hardware but configured (e.g., via programming) to support different radio access technologies, or may represent partly or entirely different physical components.

Figure 10:
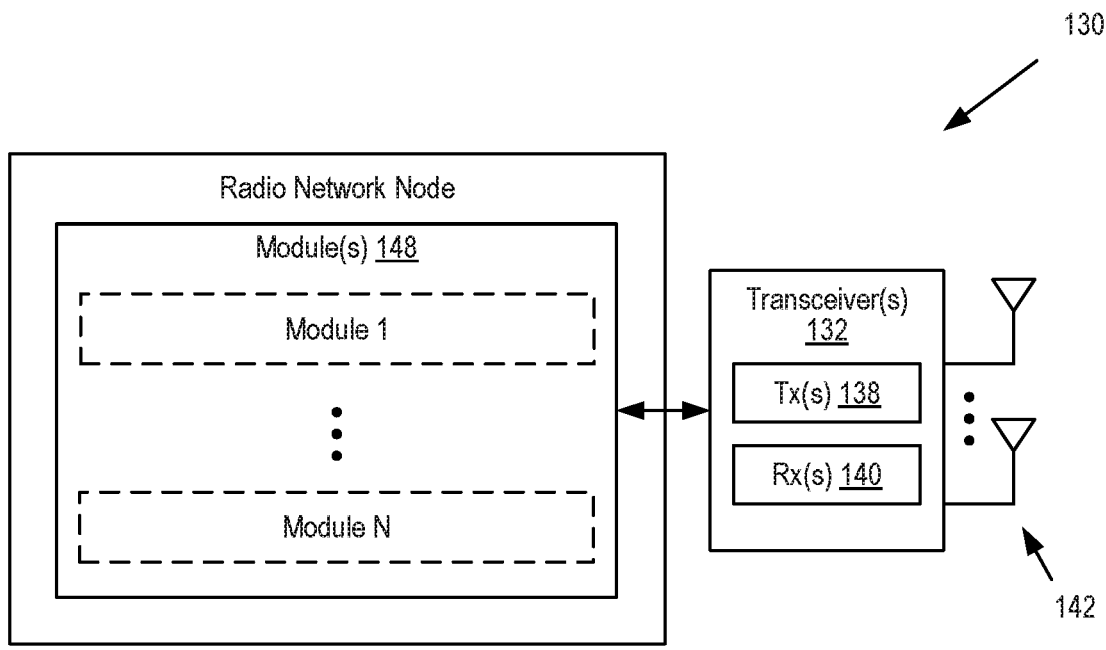
FIG. 10 is another block diagram of a radio network node according to some embodiments.

FIG. 10 is a block diagram of another exemplary radio network node 130 according to some embodiments. As illustrated, the radio network node 130 may comprise a series of modules (or units) 148 configured to implement the functionalities of the radio network node 130 described above. Referring to FIG. 10, in some embodiments, the radio network node 130 may comprise a determining module configured to determine to perform a handover of a wireless device to a target radio network node, a transmitting module configured to transmit a handover request message to the target radio network node, a receiving module configured to receive a handover request acknowledgement message from the target radio network node, the handover request acknowledgement message comprising a handover command message, and a forwarding module configured to forward the handover command message to a wireless device. In some embodiments, the radio network node 130 may additionally, or alternatively comprise a receiving module configured to receive a handover request message from a source radio network node, and a transmitting module configured to transmit a handover request acknowledgement message to the source radio network node, the handover request acknowledgement message comprising a handover command message.

It will be appreciated that the various modules 148 may be implemented as combination of hardware and/or software, for instance, the processor 134, memory 136 and transceiver(s) 132 of radio network node 130 shown in FIG. 9. Some embodiments may also include additional modules 148 to support additional and/or optional functionalities.

Some embodiments may be represented as a non-transitory software product stored in a machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause a processor to perform steps in a method according to one or more of the described embodiments. Those of ordinary skill in the art will appreciate that other instructions and operations necessary to implement the described embodiments may also be stored on the machine-readable medium. Software running from the machine-readable medium may interface with circuitry to perform the described tasks.

The above-described embodiments are intended to be examples only. Alterations, modifications and variations may be effected to the particular embodiments by those of skill in the art without departing from the scope of the description.

ABBREVIATIONS

The present description may comprise one or more of the following abbreviation:
3GPP Third Generation Partnership Project
AMF Access Management Function
CN Core Network
D2D Device-to-Device
eNB E-UTRAN Node B
EPC Evolved Packet Core
E-UTRAN Evolved Universal Terrestrial Radio Access Network
GGSN Gateway GPRS Support Node
gNB gNode B (a Node B supporting NR and connectivity to NGC)
HSPA High-Speed Packet Access
LTE Long Term Evolution
MDT Minimization of Drive Tests
MME Mobility Management Entity
NB Node B
NGC Next Generation Core
NR New Radio
PGW Packet Data Network Gateway
PS Packet Switched
QoE Quality of Experience
RAN Radio Access Network
RANAP Radio Access Network Application Part
RNC Radio Network Controller
RRC Radio Resource Control
SGSN Serving GPRS Support Node
SGW Serving Gateway
SMF Session Management Function
UE User Equipment
UMTS Universal Mobile Telecommunications System
UPF User Plane Function
UTRAN Universal Terrestrial Radio Access Network

RELATED STANDARD DOCUMENTS

The following standard documents may be related to the present description:
3GPP TS 36.331, version 14.3.0
3GPP TS 36.423, version 14.3.0

What is claimed is:

1. A wireless device, the wireless device comprising processing circuitry configured to:
perform Quality of Experience, QoE, measurements in a cell served by a source radio network node;
receive a handover command message from a target radio network node via the source radio network node, the handover command message indicating to the wireless device to handover to the target radio network node, wherein the handover command message comprises a QoE measurement reporting support indication indicating whether the target radio network node supports QoE measurement reporting, and a QoE measurement area indication indicating whether a cell served by the target radio network node is in a measurement area associated with the QoE measurements;
determine whether to report the QoE measurements to the target radio network node based, at least in part, on the QoE measurement reporting support indication comprised in the handover command message.

2. The wireless device of claim 1, wherein when determining whether to report the QoE measurements, the processing circuitry is further configured to determine to refrain from reporting the QoE measurements if the QoE measurement reporting support indication indicates that QoE measurement reporting is not supported.

3. The wireless device of claim 1, wherein when determining whether to report the QoE measurements, the processing circuitry is further configured to determine to report the QoE measurements if the QoE measurement reporting support indication indicates that QoE measurement reporting is supported.

4. The wireless device of claim 3, wherein the processing circuitry is further configured to send a QoE measurement report comprising the QoE measurements to the target radio network node.

5. The wireless device of claim 1, wherein the processing circuitry is further configured to transmit a handover confirmation message to the target radio network node.

6. The wireless device of claim 1, wherein the processing circuitry is further configured to determine whether to start new QoE measurements based, at least in part, on the QoE measurement area indication comprised in the handover command message.

7. The wireless device of claim 6, wherein when determining whether to start the new QoE measurements, the processing circuitry is further configured to determine not to start the new QoE measurements if the QoE measurement area indication indicates that the cell served by the target radio network node is not in the measurement area associated with the QoE measurements.

8. The wireless device of claim 6, wherein when determining whether to start the new QoE measurements, the processing circuitry is further configured to determine to start the new QoE measurements if the QoE measurement area indication indicates that the cell served by the target radio network node is in the measurement area associated with the QoE measurements.

9. A source radio network node, the source radio network node comprising processing circuitry configured to:
determine to perform a handover of a wireless device from the source radio network node to a target radio network node;
transmit a handover request message to the target radio network node, the handover request message comprising an indication that the wireless device has been configured for Quality of Experience, QoE, measurements;
receive a handover request acknowledgement message from the target radio network node, the handover request acknowledgement message comprising a handover command message, wherein the handover command message comprises a QoE measurement reporting support indication indicating whether the target radio network node supports QoE measurement reporting, and a QoE measurement area indication indicating whether a cell served by the target radio network node is comprised in a measurement area associated with the QoE measurements;
forward the handover command message to the wireless device.

10. The source radio network node of claim 9, wherein the handover request message further comprises QoE measurement configuration parameters.

11. The source radio network node of claim 10, wherein the QoE measurement configuration parameters comprise a list of one or more cells comprised in the measurement area associated with the QoE measurements.

12. A target radio network node, the target radio network node comprising processing circuitry configured to:
receive a handover request message from a source radio network node to handover a wireless device from the source radio network node to the target radio network node, the handover request message comprising an indication that the wireless device has been configured for Quality of Experience, QoE, measurements;
transmit a handover request acknowledgement message to the source radio network node, the handover request acknowledgement message comprising a handover command message, wherein the handover command message comprises a QoE measurement reporting support indication indicating whether the target radio network node supports QoE measurement reporting, and a QoE measurement area indication indicating whether a cell served by the target radio network node is comprised in a measurement area associated with the QoE measurements.

13. The target radio network node of claim 12, wherein the handover request message further comprises QoE measurement configuration parameters.

14. The target radio network node of claim 13, wherein the QoE measurement configuration parameters comprise a list of one or more cells comprised in the measurement area associated with the QoE measurements.

15. The target radio network node of claim 12, wherein the processing circuitry is further configured to receive a handover confirmation message from the wireless device.

* * * * *